US011752901B2

(12) United States Patent
Gandhi et al.

(10) Patent No.: US 11,752,901 B2
(45) Date of Patent: Sep. 12, 2023

(54) VEHICLE SEAT WITH TILTING SEAT PORTION

(71) Applicants: Toyota Motor Engineering & Manufacturing North America, Inc., Plano, TX (US); Miga Technologies, LLC, Silverton, OR (US)

(72) Inventors: Umesh N. Gandhi, Farmington Hills, MI (US); Brian J. Pinkelman, Ann Arbor, MI (US); Ryohei Tsuruta, Ann Arbor, MI (US); Mark A. Gummin, Silverton, OR (US)

(73) Assignees: Toyota Motor Engineering & Manufacturing North America, Inc., Plano, TX (US); Miga Technologies, LLC, Silverton, OR (US)

( * ) Notice: Subject to any disclaimer, the term of this patent is extended or adjusted under 35 U.S.C. 154(b) by 920 days.

(21) Appl. No.: 16/367,457

(22) Filed: Mar. 28, 2019

(65) Prior Publication Data

US 2020/0307416 A1    Oct. 1, 2020

(51) Int. Cl.
  *B60N 2/02*    (2006.01)
  *B60N 2/50*    (2006.01)
  *B60N 2/68*    (2006.01)
(52) U.S. Cl.
  CPC ........... *B60N 2/0248* (2013.01); *B60N 2/501* (2013.01); *B60N 2/502* (2013.01); *B60N 2/68* (2013.01);
(Continued)

(58) Field of Classification Search
  CPC ...... B60N 2/0248; B60N 2/501; B60N 2/502; B60N 2/68; B60N 2002/026;
  (Continued)

(56) References Cited

U.S. PATENT DOCUMENTS 5,583,844 A    12/1996  Wolf et al.
6,155,716 A    12/2000  Okamura et al.
(Continued)

FOREIGN PATENT DOCUMENTS

CN    101417152 A    4/2009
CN    102333504 A    1/2012
(Continued)

*Primary Examiner* — Thomas E Worden
*Assistant Examiner* — Daniel Tyler Reich
(74) *Attorney, Agent, or Firm* — Christopher G. Darrow; Darrow Mustafa PC

(57) ABSTRACT

A vehicle seat can be configured to provide support to a vehicle occupant in conditions when lateral acceleration is experienced. Shape memory material members can be operatively positioned with respect to a seat portion of the vehicle seat. The shape memory material members can be selectively activated by an activation input. When activated, the shape memory material members can engage a seat pan so as to cause the seat pan to tilt in a respective lateral direction. As a result, a seat cushion supported by the seat pan can also tilt in the respective lateral direction. The seat cushion can be tilted in a lateral direction that is opposite to the direction of the lateral acceleration. Thus, the effects of lateral acceleration felt by a seat occupant can be reduced. The shape memory material members can be selectively activated based on vehicle speed, steering angle, and/or lateral acceleration.

13 Claims, 5 Drawing Sheets

(52) U.S. Cl.
CPC .................. *B60N 2002/026* (2013.01); *B60N 2002/0268* (2013.01)

(58) Field of Classification Search
CPC ............ B60N 2002/0268; B60N 2/646; B60N 2002/0256; B60N 2/99; B60N 2/0224
See application file for complete search history.

(56) References Cited

U.S. PATENT DOCUMENTS

| | | |
|---|---|---|
| 6,481,799 B1 | 11/2002 | Whalen |
| 6,998,546 B1 | 2/2006 | Schmidt et al. |
| 7,125,077 B2 | 10/2006 | Frank |
| 7,237,847 B2 | 7/2007 | Hancock et al. |
| 7,484,735 B2 | 2/2009 | Verbrugge et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,909,403 B2 | 3/2011 | Lawall et al. |
| 8,126,615 B2 | 2/2012 | McMillen et al. |
| 8,240,677 B2 | 8/2012 | Browne et al. |
| 8,313,108 B2 | 11/2012 | Ac et al. |
| 8,366,057 B2 | 2/2013 | Vos et al. |
| 8,827,709 B1 * | 9/2014 | Gurule ..................... G09B 9/02 434/45 |
| 9,428,088 B1 | 8/2016 | Rajasingham |
| 9,457,813 B2 | 10/2016 | Hoerwick et al. |
| 9,495,875 B2 | 11/2016 | Dowdall et al. |
| 9,696,175 B2 | 7/2017 | Hansen et al. |
| 9,784,590 B2 | 10/2017 | Englehardt et al. |
| 9,827,888 B2 | 11/2017 | Patrick et al. |
| 10,007,263 B1 | 6/2018 | Fields et al. |
| 10,532,672 B1 | 1/2020 | Pinkelman et al. |
| 2003/0182041 A1 | 9/2003 | Watson |
| 2004/0195888 A1 | 10/2004 | Frye |
| 2004/0261411 A1 | 12/2004 | MacGregor |
| 2005/0082897 A1 | 4/2005 | Ropp et al. |
| 2005/0198904 A1 | 9/2005 | Browne et al. |
| 2005/0206096 A1 | 9/2005 | Browne et al. |
| 2005/0211198 A1 | 9/2005 | Froeschle et al. |
| 2006/0038745 A1 | 2/2006 | Naksen et al. |
| 2006/0223637 A1 | 10/2006 | Rosenberg |
| 2007/0046074 A1 | 3/2007 | Satta et al. |
| 2007/0246285 A1 | 10/2007 | Browne et al. |
| 2007/0246898 A1 | 10/2007 | Keefe et al. |
| 2009/0218858 A1 | 9/2009 | Lawall et al. |
| 2009/0224584 A1 | 9/2009 | Lawall et al. |
| 2009/0224587 A1 | 9/2009 | Lawall et al. |
| 2009/0242285 A1 | 10/2009 | Whetstone, Jr. |
| 2010/0066142 A1 * | 3/2010 | Gross ....................... B60N 2/62 297/284.1 |
| 2010/0282902 A1 | 11/2010 | Rajasingham |
| 2011/0038727 A1 | 2/2011 | Vos et al. |
| 2012/0232783 A1 | 9/2012 | Calkins et al. |
| 2012/0319445 A1 | 12/2012 | Zolno et al. |
| 2014/0333088 A1 | 11/2014 | Lang et al. |
| 2015/0016968 A1 | 1/2015 | Grabowska et al. |
| 2015/0197173 A1 | 7/2015 | Hulway |
| 2015/0202993 A1 | 7/2015 | Mankame et al. |
| 2016/0004298 A1 | 1/2016 | Mazed et al. |
| 2016/0084665 A1 | 3/2016 | Englehardt et al. |
| 2016/0221475 A1 * | 8/2016 | Sugiyama ................ B60N 2/14 |
| 2016/0325837 A1 * | 11/2016 | Erhel ................. B64D 11/0641 |
| 2017/0116792 A1 | 4/2017 | Jelinek et al. |
| 2017/0148102 A1 | 5/2017 | Franke et al. |
| 2017/0166222 A1 | 6/2017 | James |
| 2017/0252260 A1 | 9/2017 | Gummin et al. |
| 2018/0012433 A1 | 1/2018 | Ricci |
| 2018/0036198 A1 | 2/2018 | Mergl et al. |
| 2018/0130347 A1 | 5/2018 | Ricci et al. |
| 2018/0141562 A1 | 5/2018 | Singhal |
| 2018/0251234 A1 | 9/2018 | Wang |
| 2018/0264975 A1 | 9/2018 | Bonk et al. |
| 2018/0345841 A1 | 12/2018 | Prokhorov et al. |
| 2019/0023161 A1 | 1/2019 | Sullivan et al. |
| 2019/0042857 A1 | 2/2019 | Endo et al. |
| 2019/0059608 A1 | 2/2019 | Yan et al. |
| 2020/0223325 A1 | 7/2020 | Pinkelman et al. |
| 2020/0238854 A1 | 7/2020 | Gandhi et al. |
| 2020/0247274 A1 | 8/2020 | Gandhi et al. |
| 2020/0276971 A1 * | 9/2020 | Takeda ................. G06V 20/588 |
| 2020/0282878 A1 | 9/2020 | Gandhi et al. |
| 2020/0298732 A1 | 9/2020 | Gandhi et al. |

FOREIGN PATENT DOCUMENTS

| | | |
|---|---|---|
| CN | 103038094 A | 4/2013 |
| CN | 105517664 A | 4/2016 |
| CN | 107111473 A | 8/2017 |
| DE | 102010021902 A1 | 12/2011 |
| EP | 1904337 B1 | 12/2006 |
| EP | 1904337 B1 | 10/2010 |
| EP | 2723069 A1 | 4/2014 |
| JP | 2017175155 A | 9/2017 |
| KR | 20050056526 A | 6/2005 |
| KR | 101395364 B1 | 5/2014 |
| WO | 2009079668 A2 | 6/2009 |
| WO | 2011017071 A2 | 2/2011 |
| WO | 2014145018 A2 | 9/2014 |
| WO | 2014172320 A1 | 10/2014 |
| WO | 2016130719 A2 | 8/2016 |
| WO | 2017077541 A1 | 5/2017 |

* cited by examiner

VEHICLE SEAT WITH TILTING SEAT PORTION

FIELD

The subject matter herein relates in general to vehicles and, more particularly, to vehicle seats.

BACKGROUND

While a vehicle is in use, there are various forces that act upon the vehicle and its occupants. For instance, when the vehicle turns right or left, particularly at relatively high speeds, lateral acceleration may make a vehicle occupant feel like he or she is being pushed sideways in the opposite direction of the turn. A deep seat and stiff bolster and seat cushion can help reduce these effects.

SUMMARY

In one respect, arrangements described herein are directed to a system. The system can include a vehicle seat with a seat portion. The seat portion can include a seat cushion, a seat pan, and a seat frame. The seat cushion can be at least partially supported by the seat pan, and the seat pan can be at least partially supported by the seat frame. The system can include a first shape memory material member and a second shape memory material member. The first shape memory material member can be located between the seat pan and the seat frame. The first shape memory material member can be operatively positioned such that, when activated, the first shape memory material member engages the seat pan to cause the seat pan to tilt in a first lateral direction. As a result, the seat cushion can tilt in the first lateral direction. The second shape memory material member can be located between the seat pan and the seat frame. The second shape memory material member can be operatively positioned such that, when activated, the second shape memory material member engages the seat pan to cause the seat pan to tilt in a second lateral direction. As a result, the seat cushion can tilt in the second lateral direction.

In another respect, arrangements described herein are directed to a method of adjusting a vehicle seat. The vehicle seat can include a seat portion that includes a seat cushion, a seat pan, and a seat frame. The seat cushion can be at least partially supported by the seat pan, and the seat pan can be at least partially supported by the seat frame. A first shape memory material member can be located between the seat pan and the seat frame, and a second shape memory material member can be located between the seat pan and the seat frame. The method can include receiving sensor data from one or more sensors on a vehicle. The method can include determining, based on the sensor data, whether a seat activation condition is met. The method can include, responsive to determining that the seat activation condition is met, causing one of the first shape memory material member or the second shape memory material member to be activated so as to engage the seat pan to cause the seat pan to tilt in a respective lateral direction. As a result, the seat cushion can tilt in the respective lateral direction.

DETAILED DESCRIPTION

Figure 1:
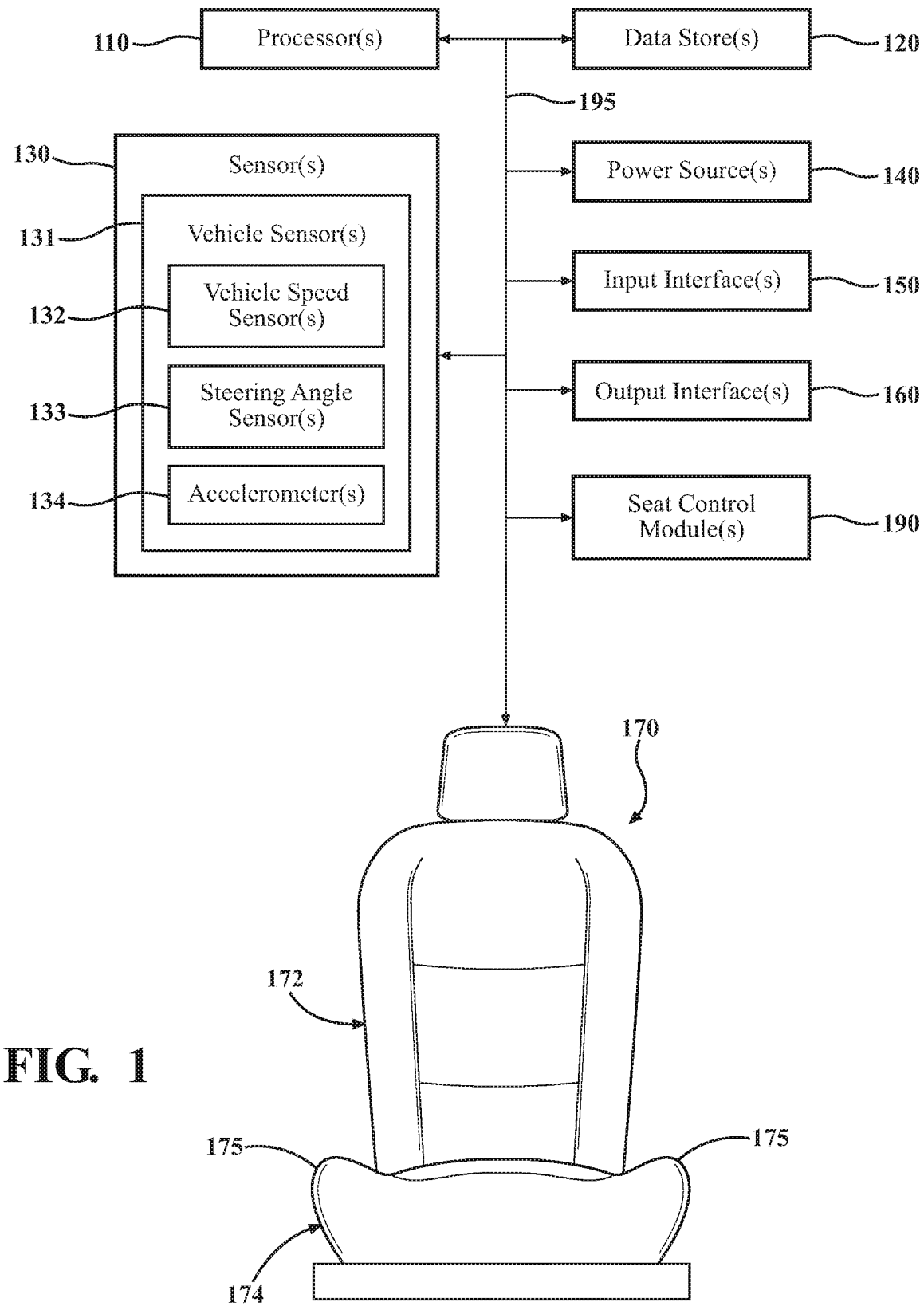
FIG. 1 is an example of a vehicle seat system.

While deep seats and stiff bolsters and seat cushions can help reduce the effects of lateral acceleration, such features may add to discomfort of a passenger during normal driving conditions in which larger lateral acceleration forces are not experienced by vehicle occupants. Accordingly, arrangements described here are directed to vehicle seats configured to selectively provide lateral support to a vehicle occupant in conditions when higher lateral acceleration is experienced.

To that end, a plurality of shape memory material members can be operatively positioned with respect to a seat portion of a vehicle seat. The shape memory material members can include shape memory alloys (SMA) or shape memory polymers (SMP). In one or more arrangements, the shape memory material members can be SMA wires. The seat portion can include a seat cushion, a seat pan, and a seat frame. The shape memory material members can be operatively positioned such that, when selectively activated (e.g., by heating), the selectively activated shape memory material member engages the seat pan to cause the seat pan to tilt in a respective lateral direction (i.e., left or right). As a result, the seat cushion can tilt in the respective lateral direction and/or otherwise be deformed or adjusted.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a system 100 for a vehicle seat is shown. The system 100 can be used in connection with any type of vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport.

The vehicle can have an autonomous operational mode and/or a semi-autonomous operational mode. For instance, the vehicle can have an autonomous operational mode in which or more computing systems are used to navigate and/or maneuver the vehicle along a travel route with no input or supervision required from a human driver. The vehicle can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle can have a manual operational mode in which all of or a majority of the navigation and/or maneuvering of the vehicle is performed by a human driver. In one or more arrangements, the vehicle can be a conventional vehicle that is configured to operate in only a manual mode.

The system 100 can include various elements. Some of the possible elements of the system 100 are shown in FIG. 1 and will now be described. It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, while the various elements may be located on or within a vehicle, it will be understood that one or more of these elements can be located external to the vehicle. Thus, such elements are not located on, within, or otherwise carried by the vehicle. Further, the elements shown may be physically separated by large distances. Indeed, one or more of the elements can be located remote from the vehicle.

The system 100 can include one or more processors 110, one or more data stores 120, one or more sensors 130, one or more power sources 140, one or more input interfaces 150, one or more output interfaces 160, one or more seats 170, and one or more seat control modules 190. Each of these elements will be described in turn below.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of a vehicle. For instance, one or more processors 110 can be electronic control unit(s) (ECU).

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors 130, the sensors can work independently from each other. Alternatively, two or more of the sensors can work in combination with each other. In such case, the two or more sensors can form a sensor network. The sensor(s) 130 can be operatively connected to the processor(s) 110, the data store(s) 120, and/or other elements of the system 100 (including any of the elements shown in FIG. 1).

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 131. The vehicle sensor(s) 131 can detect, determine, assess, monitor, measure, quantify and/or sense information about a vehicle itself (e.g., position, orientation, speed, etc.). In one or more arrangements, the vehicle sensors 131 can include one or more vehicle speed sensors 132, one or more steering angle sensors 133, and/or one or more accelerometers 134. The vehicle speed sensors 132 can be any sensor configured to detect, determine, assess, monitor, measure, quantify and/or sense the speed of a vehicle, now known or later developed. The steering angle sensors 133, can be any sensor configured to detect, determine, assess, monitor, measure, quantify and/or sense the steering wheel position angle and/or rate of turn, now known or later developed. The accelerometers 134 can include any sensor, now know or later developed, configured to detect, determine, assess, monitor, measure, quantify and/or sense any information or data about acceleration forces experience by a vehicle or occupants of the vehicle, including lateral acceleration forces.

The sensor(s) 130 can include one or more environment sensors configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensors can include one or more cameras, one or more radar sensors, one or more lidar sensors, one or more sonar sensors, and/or one or more ranging sensors.

As noted above, the system 100 can include one or more power sources 140. The power source(s) 140 can be any power source capable of and/or configured to energize the shape memory material members, as will be described later. For example, the power source(s) 140 can include one or more batteries, one or more fuel cells, one or more generators, one or more alternators, one or more solar cells, and combinations thereof.

The system 100 can include one or more input interfaces 150. An "input interface" includes any device, component, system, element or arrangement or groups thereof that enable information/data to be entered into a machine. The input interface(s) 150 can receive an input from a vehicle occupant (e.g. a driver or a passenger). Any suitable input interface 150 can be used, including, for example, a keypad, display, touch screen, multi-touch screen, button, joystick, mouse, trackball, microphone and/or combinations thereof.

The system 100 can include one or more output interfaces 160. An "output interface" includes any device, component, system, element or arrangement or groups thereof that enable information/data to be presented to a vehicle occupant (e.g. a person, a vehicle occupant, etc.). The output interface(s) 160 can present information/data to a vehicle occupant. The output interface(s) 160 can include a display. Alternatively or in addition, the output interface(s) 160 may include an earphone and/or speaker. Some components of the system 100 may serve as both a component of the input interface(s) 150 and a component of the output interface(s) 160.

The system 100 can include one or more seats 170. The seat(s) 170 can be for any vehicle occupants, such for a driver or for a passenger. The seat(s) 170 can be any type of vehicle seat, now known or later developed. The one or more seats 170 can have any suitable configuration. For instance, the one or more seats 170 can include a back portion 172 and a seat portion 174. According to arrangements herein, one or more portions of the seat(s) 170 can be configured to counteract lateral acceleration forces experienced by a vehicle occupant.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions.

In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 100 can include one or more seat control modules 190. The seat control module(s) 190 can include profiles and logic for actively controlling the seat portion 174 according to arrangements herein. The seat control module(s) 190 can be configured to determine when the seat portion 174 should be activated or deactivated. The seat control module(s) 190 can be configured to do so in any suitable manner. For instance, the seat control module(s) 190 can be configured to analyze data or information acquired by the sensor(s) 130 (e.g., the vehicle speed sensor(s) 132, the steering angle sensor(s) 133, and/or the accelerometers 134). Alternatively or additionally, the seat control module(s) 190 can be configured to detect user inputs (e.g., commands) provided on the input interface(s) 150. The seat control module(s) 190 can retrieve raw data from the sensor(s) 130 and/or from the data store(s) 120. The seat control module(s) 190 can use profiles, parameters, or setting loaded into the seat control module(s) 190 and/or stored in the data store(s) 120.

The seat control module(s) 190 can analyze the sensor data to determine an appropriate action for the seat(s) 170. The seat control module(s) 190 can be configured to cause one or more shape memory material members to be activated or deactivated. As used herein, "cause" or "causing" means to make, force, compel, direct, command, instruct, and/or enable an event or action to occur or at least be in a state where such event or action may occur, either in a direct or indirect manner. For instance, the seat control module(s) 190 can selectively permit or prevent the flow of electrical energy from the power source(s) 140 to the seat portion 174, or, more particularly, to one or more shape memory material members associated with the seat portion 174. The seat control module(s) 190 can be configured send control signals or commands over a communication network 195 to the shape memory material members.

The seat control module(s) 190 can be configured to cause the shape memory material members associated with the seat portion 174 to be selectively activated or deactivated based on one or more activation parameters. For instance, the seat control module(s) 190 can be configured to compare one or more detected activation characteristics to one or more activation thresholds. If the threshold is met, then the seat control module(s) 190 can cause one or more shape memory material members associated with the seat portion 174 to be activated or maintained in an activated condition. If the threshold is not met, then the seat control module(s) 190 can cause the shape memory material member(s) to be deactivated or maintained in a deactivated or non-activated state.

For instance, there can be a vehicle speed threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. If a detected vehicle speed is above the vehicle speed threshold, the seat control module(s) 190 can be configured to cause the shape memory material members to be activated or maintained in an activated state. If a detected vehicle speed is below the vehicle speed threshold, the seat control module(s) 190 can be configured to cause the shape memory material member(s) to be deactivated or maintained in a deactivated state.

As another example, there can be a steering angle threshold. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. If a detected steering angle is above the steering angle threshold, the seat control module(s) 190 can be configured to cause the shape memory material member(s) to be activated or maintained in an activated state. If a detected steering angle is below the vehicle speed threshold, the seat control module(s) 190 can be configured to cause the shape memory material member(s) to be deactivated or maintained in a deactivated state.

In one or more arrangements, the seat control module(s) 190 can be configured to cause the shape memory material member(s) to be selectively activated or deactivated based on both a vehicle sped threshold and a steering angle threshold. Thus, if a detected vehicle speed is above the vehicle speed threshold and if a detected steering angle is above the steering angle threshold, the seat control module(s) 190 can be configured to cause the shape memory material member(s) to be activated or maintained in an activated state. If a detected vehicle speed is below the vehicle speed threshold and/or if a detected steering angle is below the steering angle threshold, the seat control module(s) 190 can be configured to cause the shape memory material member(s) to be deactivated or maintained in a deactivated state.

As another example, there can be an acceleration threshold, such as a lateral acceleration threshold. Thus, if a detected or determined lateral acceleration of the vehicle is above the lateral acceleration threshold, the seat control module(s) 190 can be configured to cause the shape memory material member(s) to be activated or maintained in an activated state. If a detected steering angle is below the lateral acceleration threshold, the seat control module(s) 190 can be configured to cause the shape memory material member(s) to be deactivated or maintained in a deactivated state.

In some instances, the seat control module(s) 190 can be configured to cause the shape memory material member(s) to be selectively activated or deactivated based on user inputs (e.g., commands). For instance, a user can provide an input on the input interface(s) 150. The input can be to activate or deactivate the shape memory material member(s). The seat control module(s) 190 can be configured to cause the shape memory material member(s) to be deactivated or activated in accordance with the user input.

The seat control module(s) 190 can be configured to control a plurality of seats 170. The seat control module(s) 190 can be configured to control each seat 170 individually. Thus the control of one seat 170 is independent of the control of the other seats 170. Alternatively, the seat control module(s) 190 can be configured to control the plurality of seat(s) 170 collectively. Thus, each seat 170 can be activated or deactivated at substantially the same time, to the same degree of actuations, and/or in substantially the same manner.

It should be noted that the seat control module(s) 190 can be configured to determine the direction is which lateral acceleration will occur. Thus, if the seat control module(s) 190 determines that the direction of lateral acceleration will be to the right, the seat control module(s) 190 can activate the shape memory material member(s) on the opposite side (i.e., left side) of the seat 170. Similarly, if the seat control module(s) 190 determines that the direction of lateral acceleration will be to the left, the seat control module(s) 190 can activate the shape memory material member(s) on the opposite (i.e., right) side of the seat 170.

The various elements of the system 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the system 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2:
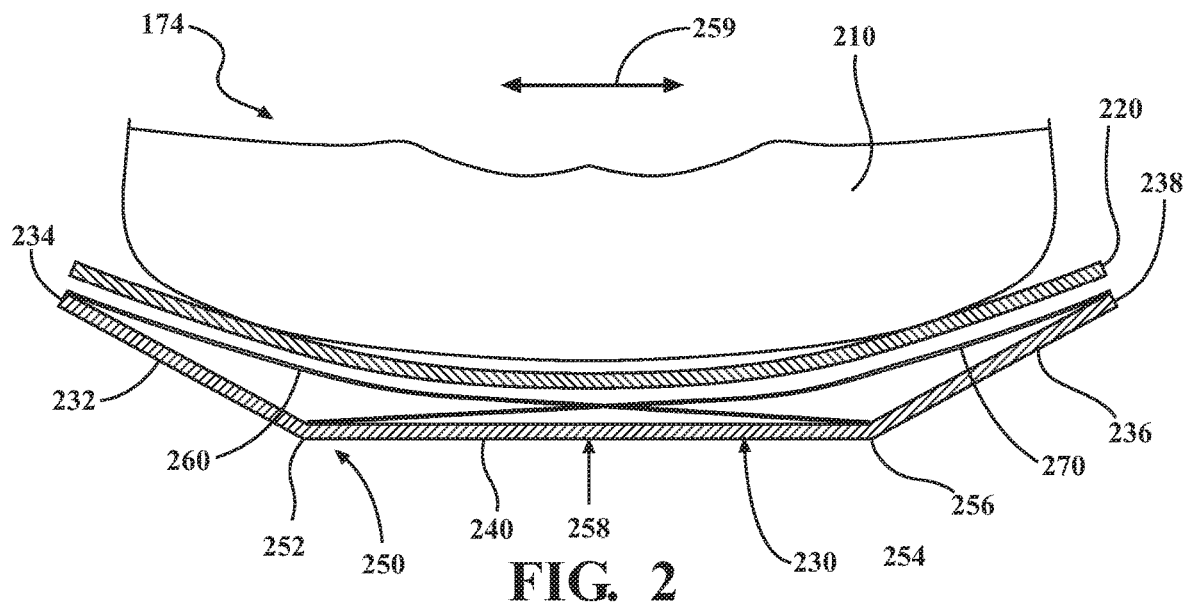
FIG. 2 is an example of a seat portion of a vehicle seat, showing a non-activated configuration.

Referring to FIG. 2, an example of the seat portion 174 of the vehicle seat 170 is shown. The seat portion 174 can include a seat cushion 210. The seat cushion 210 can be made of any suitable material, now known or later developed. For instance, the seat cushion 210 can be made of a foam material. The seat cushion 210 can include an outer covering, such as fabric or leather. The seat cushion 210 can have any suitable size, shape, and/or configuration. In some arrangements, the seat cushion 210 can include bolsters 175 (see, e.g., FIG. 1).

The seat portion 174 can include a seat pan 220. The seat pan 220 can have any suitable size, shape, and/or configuration. As an example, the seat pan 220 can be a substantially U-shaped structure. The seat pan 220 can be oriented such that it opens in a substantially upward direction. The seat pan 220 can be made of any suitable material. In one or more arrangements, the seat pan 220 can be made of a rigid material. For example, the seat pan 220 can be made of metal or plastic.

In one or more arrangements, the seat pan 220 can at least partially support the seat cushion 210. In one or more arrangements, a portion of the seat cushion 210 can be received in the seat pan 220.

The seat portion 174 can include a seat frame 230. The seat frame 230 can be made of any suitable material. In one or more arrangements, the seat frame 230 can be made of a rigid material. For example, the seat frame 230 can be made of metal or plastic. In some arrangements, the seat frame 230 can be operatively connected to a vehicle frame member.

In one or more arrangements, the seat frame 230 can at least partially support the seat pan 220. In one or more arrangements, a portion of the seat pan 220 can be received in the seat frame 230.

The seat frame 230 can have any suitable size, shape, and/or configuration. As an example, the seat frame 230 can be a substantially U-shaped structure. The seat frame 230 can be oriented such that it opens in a substantially upward direction.

In one or more arrangements, the seat frame 230 can include a first end portion 232 and a second end portion 236.

The first end portion 232 can include a first end 234. The second end portion 236 can include a second end 238. A central portion 240 can be located between the first end portion 232 and the second end portion 236. The central portion 240 can have a midpoint 258 or middle region in the lateral direction 259 (i.e., left-to-right on the page in FIG. 2). In one or more arrangements, the midpoint 258 can be located substantially at the exact mathematical midpoint of the central portion 240 in the lateral direction.

In one or more arrangements, the first end portion 232 and/or the second end portion 236 can be angled relative to the central portion 240. The first end portion 232 can transition to the central portion 240 at a first transition region 250. In one or more arrangements, the first transition region 250 can include a corner 252 and/or a bend. The second end portion 236 can transition to the central portion 240 at a second transition region 254. In one or more arrangements, the second transition region 254 can include a corner 256 or a bend.

The seat portion 174 can include a first shape memory material member 260 and a second shape memory material member 270. The first shape memory material member 260 and the second shape memory material member 270 can be substantially identical to each other, or they can be different in one or more respects.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the first and/or second shape memory material members 260, 270 can be shape memory material wires. As an example, the first and/or second shape memory material members 260, 270 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 90 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the first and second shape memory material members 260, 270 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, Calif. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the TSMA to a temperature greater than the TSMA.

Other active materials may be used in connected with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the first and second shape memory material members 260, 270 are described, in one implementation, as being wires, it will be understood that the first and second shape memory material members 260, 270 are not limited to being wires. Indeed, it is envisioned that suitable shape memory materials may be employed in a variety of other forms, such as strips, small sheets or slabs, cellular and lattice structures, helical or tubular springs, braided cables, tubes, or combinations thereof. In some arrangements, the first and/or second shape memory material members 260, 270 may include an insulating coating.

Figure 3:
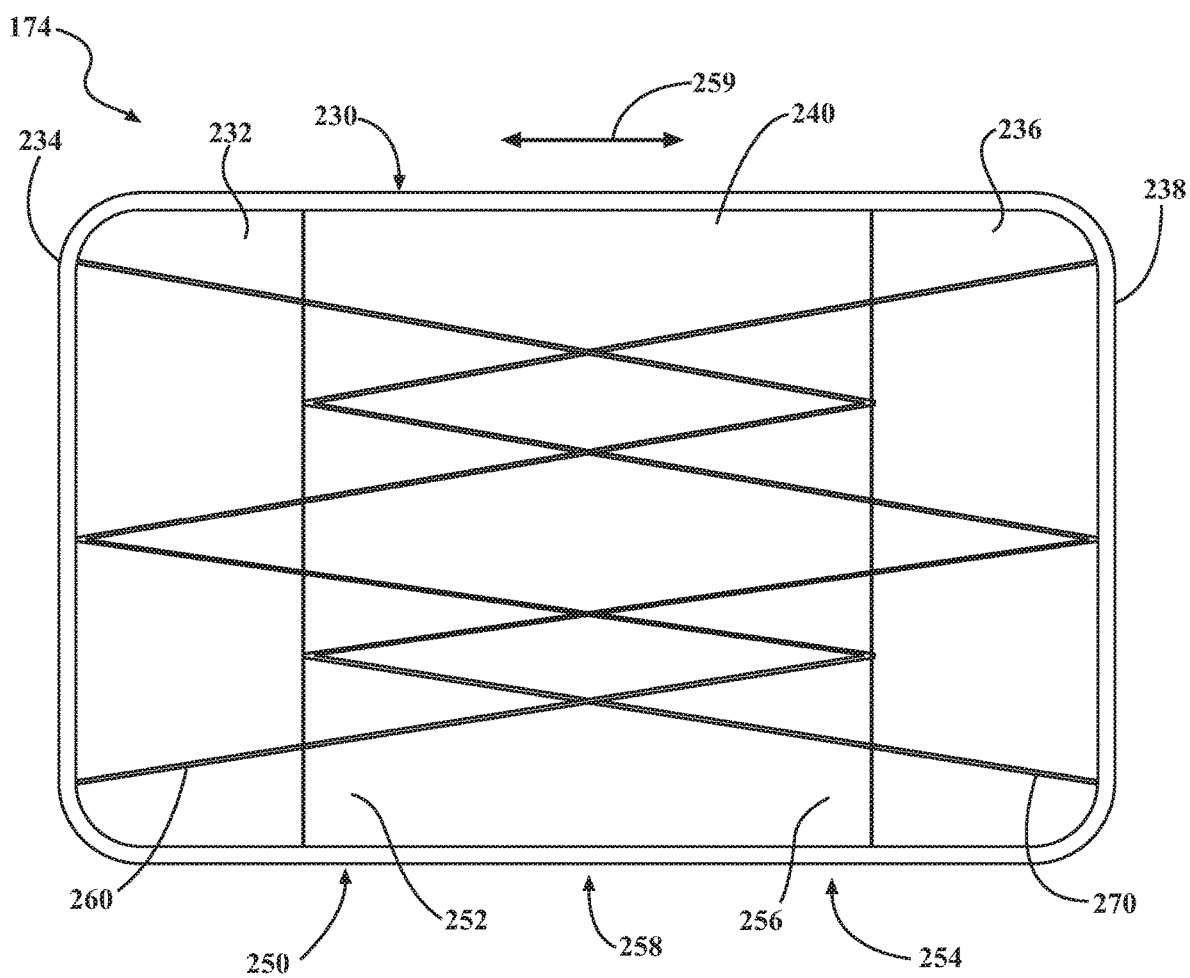
FIG. 3 shows a top view of the seat portion of the vehicle seat, showing an example of an arrangement of a plurality of shape memory material members.

The first and second shape memory material members 260, 270 can be generally located between the seat pan 220 and the seat frame 230. The first and second shape memory material members 260, 270 can be arranged in various ways. A non-limiting example of one arrangement is shown in FIG. 3, which shows a top view of the seat portion 174. The seat cushion 210 and the seat pan 220 are not shown for clarity.

In one or more arrangements, the first and second shape memory material members 260, 270 can be arranged in an alternating serpentine pattern. "Serpentine" includes a plurality of curves, turns, and/or winds in alternating directions. A zig-zag pattern in one example of serpentine. The shape memory material members 260, 270 can be operatively connected to structures in any suitable manner, including by one or more fasteners, one or more adhesives, one or more welds, one or more forms of mechanical engagement, and/or one or more structures, just to name a few possibilities.

In one or more arrangements, the first shape memory material member 260 can be operatively connected to the first end portion 232. The first shape memory material member 260 can extend from the first end portion 232 and across the midpoint 258 of the central portion 240. The first shape memory material member 260 can be operatively connected to the seat frame 230 at or near the second transition region 254. "At or near the second transition region" includes anywhere in the second transition region 254, such as at the corner 256. It can also include on the central portion 240 near the second transition region 254 or on the second end portion 236 near the second transition region 254. In one or more arrangements, the first shape memory material member 260 can be operatively connected to the first end portion 232 and at or near the second transition region 254 in an alternating manner, as is shown in FIG. 3.

In one or more arrangements, the second shape memory material member 270 can be operatively connected to the second end portion 236. The second shape memory material member 270 can extend from the second end portion 236 and across the midpoint 258 of the central portion 240. The second shape memory material member 270 can be operatively connected to the seat frame 230 at or near the first transition region 250. "At or near the first transition region" includes anywhere in the first transition region 250, such as at the corner 252. It can also include on the central portion 240 near the first transition region 250 or on the first end portion 232 near the first transition region 250. In one or more arrangements, the first shape memory material member 260 can be operatively connected to the second end portion 236 and at or near the first transition region 250 in an alternating manner, as is shown in FIG. 3.

The first shape memory material member 260 and the second shape memory material member 270 can overlap each other at various points. The first shape memory material member 260 and the second shape memory material member 270 may or may not touch each other at these points of overlap.

In one or more arrangements, the first and second shape memory material members 260, 270 can be arranged in substantially the same manner, as is shown in FIG. 3. However, in one or more arrangements, the first and second shape memory material members 260, 270 can be arranged in different manners. The first and second shape memory material members 260, 270 can be activated independently of each other.

The seat portion 174 can have a non-activated configuration and a plurality of activated configurations. Each of these configurations will be described in turn. FIG. 2 shows an example of a non-activated configuration of the seat portion 174. In such case, an activation input is not provided to the first and second shape memory material members 260, 270. For instance, when the first and second shape memory material members 260, 270 are shape memory material wires, an activation input (e.g., electrical current) to heat the wires is not provided. Thus, the first and second shape memory material members 260, 270 in a neutral or non-activated condition. When not activated, the first and second shape memory material members 260, 270 are slack or otherwise not taut. As a result, the first and second shape memory material members 260, 270 does not substantially engage the seat pan 220. While there may be some contact between the first and second shape memory material members 260, 270 and the seat pan 220, a majority or a substantial majority of the first and second shape memory material members 260, 270 do not contact the seat pan 220.

Figure 4A:
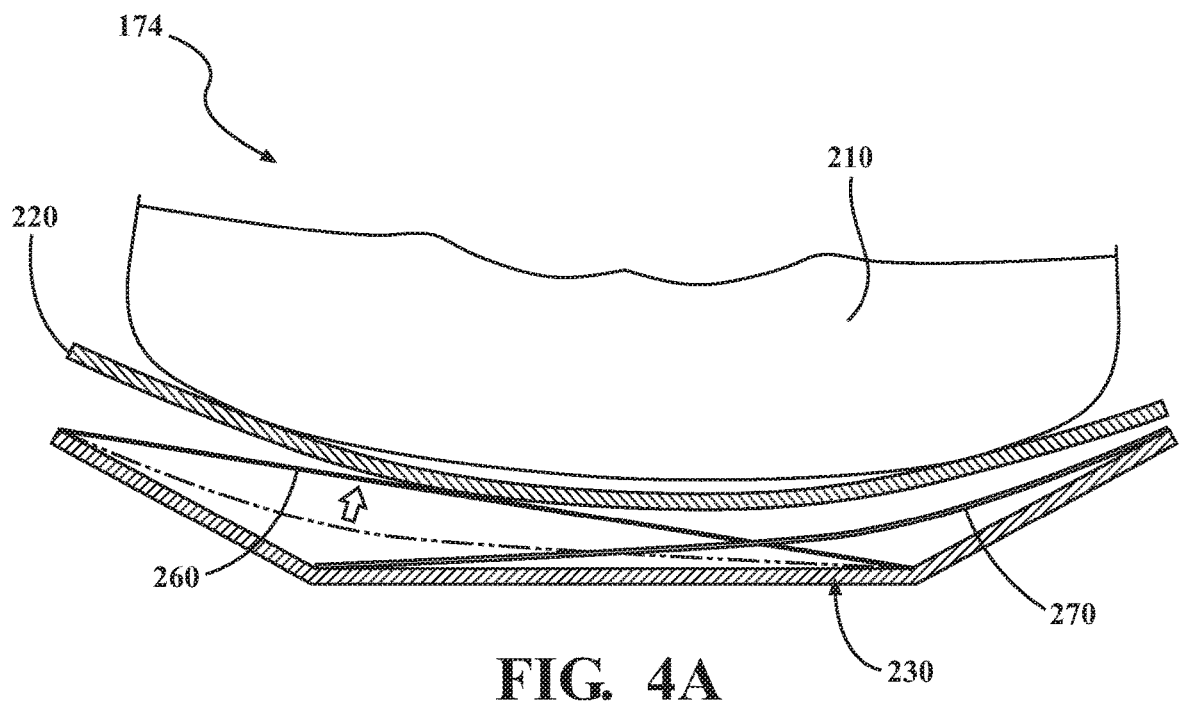
FIG. 4A is an example of the seat portion of the vehicle seat, showing a first activated configuration.

FIG. 4A shows an example of a first activated configuration of the seat portion 174. In such case, the first shape memory material member 260 can be activated. For example, electrical energy can be supplied to the first shape memory material member 260 from the power source(s) 140. The second shape memory material member 270 is not activated. When activated, the first shape memory material member 260 can contract and/or can become taut. The first shape memory material member 260 can directly engage the seat pan 220, which can cause the seat pan 220 to tilt toward a first lateral direction (i.e., to the right of the page in FIG. 4A). As a result, the seat cushion 210 can also be tilted in the first lateral direction by the seat pan 220, or that side of the seat cushion 210 can be deformed, moved, and/or enlarged by the tilting of the seat pan 220. It will be appreciated that the seat cushion 210 can provide resistance to lateral acceleration of a vehicle occupant in the second direction, such as when a vehicle is turning.

Figure 4B:
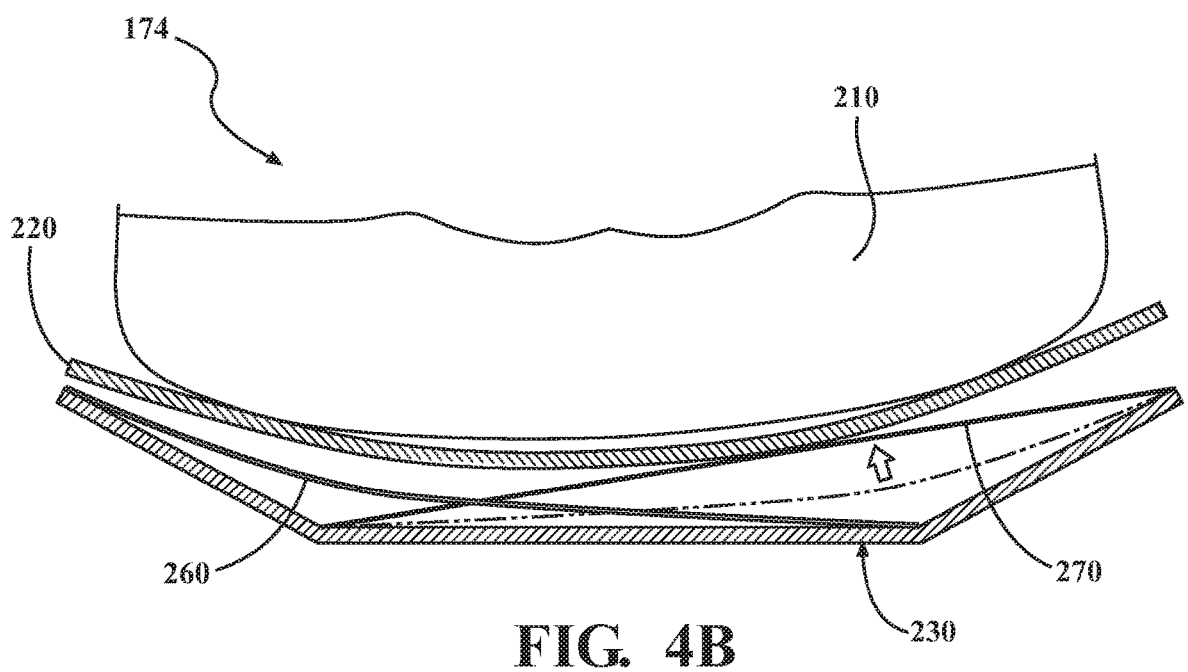
FIG. 4B is an example of the seat portion of the vehicle seat, showing a second activated configuration.

FIG. 4B shows an example of a second activated configuration of the seat portion 174. In such case, the second shape memory material member 270 can be activated. For example, electrical energy can be supplied to the second shape memory material member 270 from the power source(s) 140. The first shape memory material member 260 is not activated. When activated, the second shape memory material member 270 can contract become taut. The second shape memory material member 270 can directly engage the seat pan 220, which can cause the seat pan 220 to tilt toward a second lateral direction (i.e., to the left of the page in FIG. 4B). As a result, the seat cushion 210 can also be tilted in the second lateral direction by the seat pan 220, or that side of the seat cushion 210 can be deformed, moved, and/or enlarged by the tilting of the seat pan 220. It will be appreciated that the seat cushion 210 can provide resistance to lateral acceleration of a vehicle occupant in the first direction, such as when a vehicle is turning.

It will be appreciated that, when the activation input is discontinued, the first or second shape memory material members 260, 270 can substantially return to a neutral or non-activated configuration, such as shown in FIG. 2. As a result, the first shape memory material member 260 or the second shape memory material member 270 can substantially disengage from the seat pan 220, allowing it to substantially return to a non-activated configuration. Further, it will be appreciated that the seat cushion 210 can substantially return to a non-activated condition.

Now that the various potential systems, devices, elements and/or components of the system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
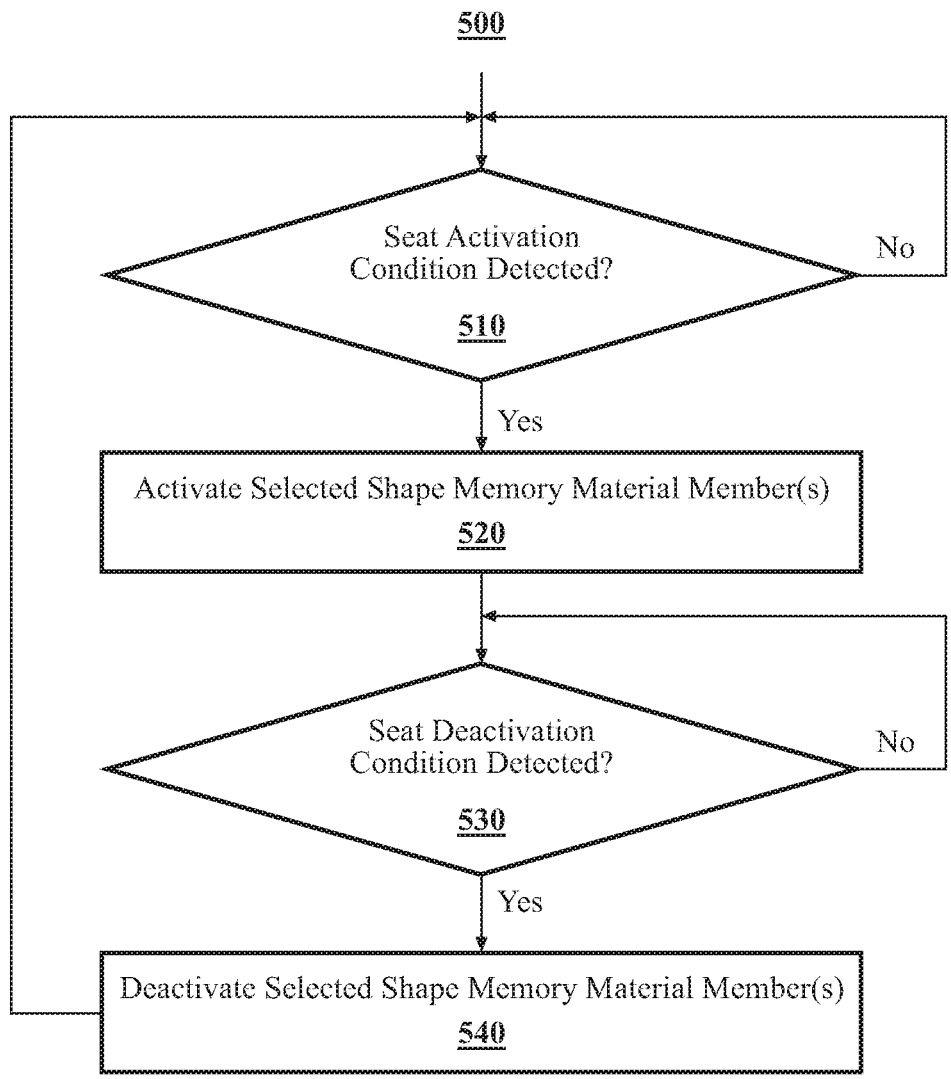
FIG. 5 is an example of a method of adjusting a vehicle seat.

Turning to FIG. 5, an example of a method 500 is shown. For the sake of discussion, the method 500 can begin with the first and second shape memory material members 260, 270 in a non-activated mode, such as is shown in FIG. 2. In the non-activated mode, electrical energy from the power source(s) 140 is not supplied to the first and second shape memory material members 260, 270. At block 510, it can be determined whether a seat activation condition has been detected. The seat activation condition can be actual, predicted, and/or inferred lateral acceleration. The seat activation condition may be detected by the seat control module(s) 190, the processor(s) 110, and/or one or more sensor(s) 130. For instance, the seat control module(s) 190, the processor(s) 110, and/or one or more sensor(s) 130 can determine that data acquired by the vehicle sensor(s) 131 meets a seat activation condition. For instance, the seat control module(s) 190, the processor(s) 110, and/or one or more sensor(s) 130 can determine whether the current vehicle speed and/or the current steering angle meet respective seat activation threshold. Alternatively or additionally, the seat control module(s) 190, the processor(s) 110, and/or one or more sensor(s) 130 can determine whether the current lateral acceleration meets respective seat activation threshold. Alternatively or in addition, the seat control module(s) 190, the processor(s) 110, and/or one or more sensor(s) 130 can detect a user input indicating that the interface should be activated. The user input can be provided via the input interface(s) 150.

If a seat activation condition is not detected, the method 500 can end, return to block 510, or proceed to some other block. However, if a seat activation condition is detected, then the method can proceed to block 520. At block 520, the first shape memory material member 260 or the second shape memory material member 270 can be activated. Which shape memory material member is activated can depend on the direction of the actual, predicted, and/or inferred lateral acceleration. Thus, the seat control module(s) 190 and/or the processor(s) 110 may only activate one of the shape memory material members while leaving the other in a non-activated state depending on the seat activation condition. Thus, the seat control module(s) 190 and/or the processor(s) 110 can cause or allow the flow of electrical energy from the power sources(s) 140 to the first shape memory material member 260 or the second shape memory material member 270.

When activated, the first shape memory material member 260 or the second shape memory material member 270 can morph to an activated configuration, such as is shown in FIG. 4B or 4B, respectively. The activated shape memory material member 260 or 270 can contact, reducing its slack and even becoming taut. The taut shape memory material memory member can engage (e.g., by direct contact) the seat pan 220. As a result, the seat pan 220 will tilt, which, in turn, can cause the seat cushion 210 to tilt into an activated configuration, such as is shown in FIG. 4B. The method can continue to block 530.

At block 530, it can be determined whether a seat deactivation condition has been detected. The seat deactivation condition may be detected by the seat control module(s) 190, such as based on data acquired by the sensor(s) 130 and/or by detecting a user input or the cessation of a user input. If a seat deactivation condition is not detected, the method 500 can return to block 530, or proceed to some other block. However, if a deactivation condition is detected, then the method can proceed to block 540. At block 540, the activated one of the first shape memory material member 260 or the second shape memory material member 270 can be deactivated. Thus, the seat control module(s) 190 and/or the processor(s) 110 can cause the flow of electrical energy from the power sources(s) 140 to the activated one of the first shape memory material member 260 or the second shape memory material member 270 to be discontinued.

As a result, the deactivated one of the first shape memory material member 260 or the second shape memory material member 270 can disengage from the seat pan 220. Consequently, the seat pan 220 can substantially return to a non-activated configuration, such as is shown in FIG. 2. Of course, the seat cushion 210 can also substantially return to a non-activated condition.

The method 500 can end. Alternatively, the method 500 can return to block 510 or some other block.

Figure 6A:
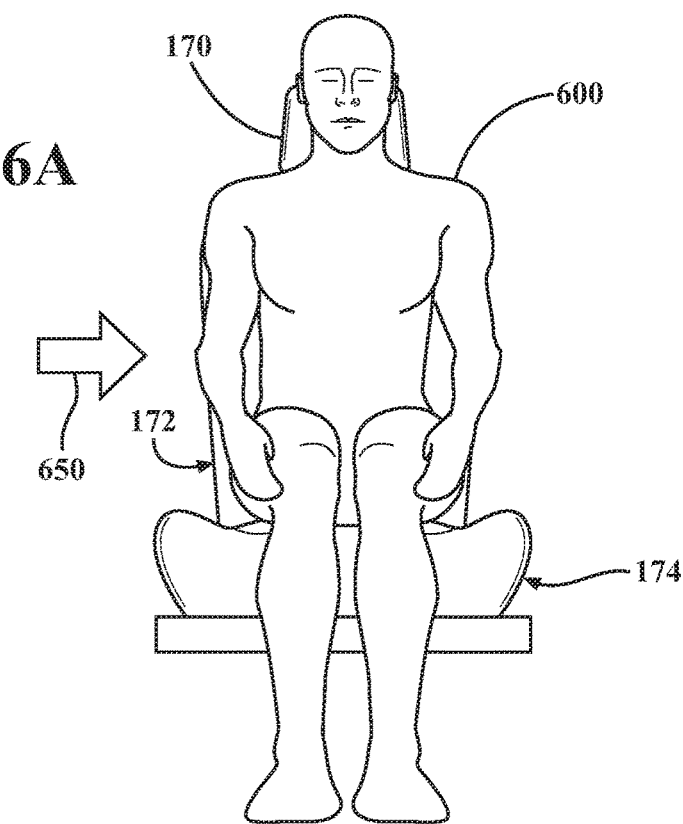
FIG. 6A shows an example of an occupant in a vehicle seat in a non-activated configuration.
Figure 6B:
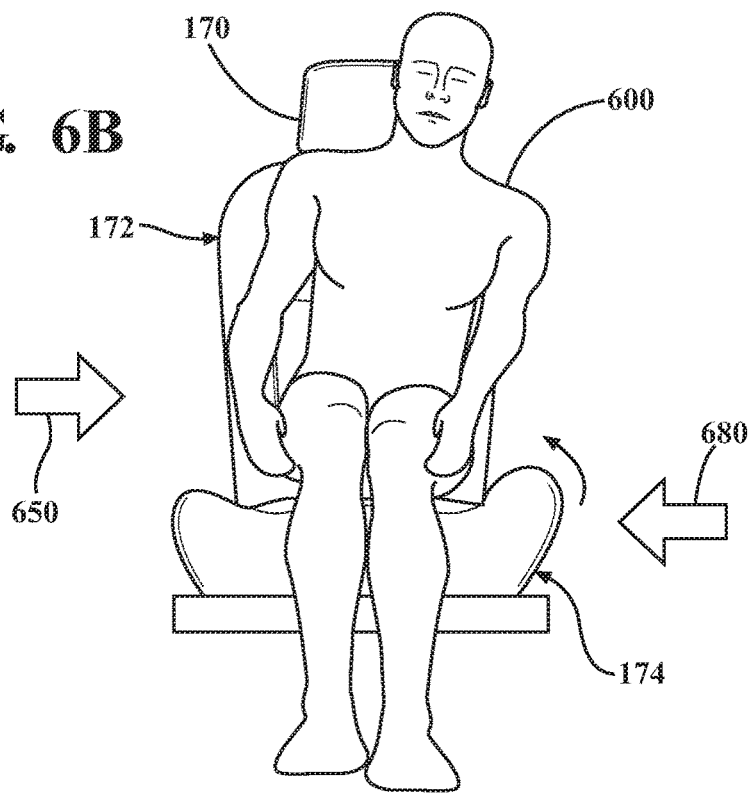
FIG. 6B shows an example of the occupant in the vehicle seat in the second activated configuration.

A non-limiting example of the operation of the arrangements described herein will now be presented in connection to FIGS. 6A-6B. These figures show an occupant 600 in the vehicle seat 170. The vehicle seat 170 can include the one of the first shape memory material member 260 or the second shape memory material member 270, though the one of the first shape memory material member 260 or the second shape memory material member 270 are not shown in FIGS. 6A-6B. FIG. 6A shows an example of an occupant in a vehicle seat when the one of the first shape memory material member 260 or the second shape memory material member 270 s are in a non-activated configuration. As the vehicle makes a right turn, particularly at higher speeds, lateral acceleration forces 650 can act upon the vehicle and/or occupant 600. As a result, the occupant 600 may actually be or may feel like he or she is being pushed, moved, and/or forced at least to the left due to such forces.

Accordingly, the second shape memory material member 270 on the left side of the vehicle seat 170 can be activated. Thus, the seat pan 220 can be tilted toward the right. The tilting of the seat pan 220 can cause a deformation of the seat cushion 210. In some instances, the seat cushion 210 can tilt, or it can otherwise become enlarged or upwardly deformed on the left side. FIG. 6B shows an example of the occupant in the vehicle seat 170 when the second shape memory material member 270 is in the activated configuration. Thus, the seat portion 174 can provide lateral support 680 to the occupant 600, which can help to reduce the effects experienced by the occupant 600 due to the lateral acceleration forces 650.

It will be appreciated that arrangements described herein can provide numerous benefits, including one or more of the benefits mentioned herein. For example, arrangements described herein can provide lateral support for a vehicle occupant in conditions in which high lateral acceleration forces are experienced by the occupant. Arrangements described herein can also allow a vehicle seat to be selectively tilted or otherwise deformed so as to counteract lateral acceleration forces. Thus, the vehicle seat can be in a normal configuration in most driving conditions and tilted when needed, thereby increasing occupant comfort. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system comprising:
    a vehicle seat including a seat portion, the seat portion including:
    a seat cushion;
    a seat pan, the seat cushion being at least partially supported by the seat pan; and
    a seat frame, the seat pan being at least partially supported by the seat frame;
    a first shape memory material member located between the seat pan and the seat frame, the first shape memory material member being operatively positioned such that, when activated, the first shape memory material member becomes taut and directly contacts an underside of the seat pan to cause the entire seat pan to tilt in a first lateral direction, whereby the seat cushion tilts in the first lateral direction, and when not activated, the first shape memory material member becomes slack and does not substantially engage the seat pan, whereby the seat cushion does not tilt in the first lateral direction; and
    a second shape memory material member located between the seat pan and the seat frame, the second shape memory material member being operatively positioned such that, when activated, the second shape memory material member becomes taut and directly contacts an underside of the seat pan to cause the entire seat pan to tilt in a second lateral direction, whereby the seat cushion tilts in the second lateral direction, and when not activated, the second shape memory material member becomes slack and does not substantially engage the seat pan, whereby the seat cushion does not tilt in the second lateral direction,
    the first shape memory material member and the second shape memory material member being arranged in an alternating pattern on opposite sides of the seat pan, the first shape memory material member and the second shape memory material member being arranged so as to overlap each other at one or more points, one or more power sources operatively connected to the first shape memory material member and the second shape memory material member;

one or more sensors are configured to acquire sensor data about at least one of: vehicle speed, steering wheel angle, and lateral acceleration; and one or more processors operatively connected to control a supply of electrical energy from the one or more power sources to the first shape memory material member and the second shape memory material member, the one or more processors being operatively connected to the one or more sensors, the one or more processors being programmed to initiate executable operations comprising:

determine, based on sensor data acquired by one or more sensors, whether a seat activation condition is met, the seat activation condition being at least one of a vehicle speed threshold, a steering angle threshold, and a lateral acceleration threshold; and responsive to determining that the seat activation condition is met, causing electrical energy to be supplied to one of the first shape memory material member or the second shape memory material member from the one or more power sources, whereby one of the first shape memory material member or the second shape memory material member is activated.

2. The system of claim 1, wherein the first shape memory material member or the second shape memory material member is a shape memory alloy.

3. The system of claim 1, wherein the first shape memory material member or the second shape memory material member is a shape memory alloy wire.

4. The system of claim 1, wherein the first shape memory material member or the second shape memory material member is arranged in a serpentine pattern.

5. The system of claim 1, wherein the seat frame includes:
a first end portion including a first end;
a second end portion including a second end; and
a central portion located between the first end portion and the second end portion, the central portion including a lateral midpoint, wherein a first transition region is defined between the first end portion and the central portion, and wherein a second transition region is defined between the second end portion and the central portion, wherein the first shape memory material member is operatively connected to the first end portion, wherein the first shape memory material member extends from the first end portion and across the lateral midpoint of the central portion, and wherein the first shape memory material member is operatively connected to the seat frame at or near the second transition region.

6. The system of claim 5, wherein the second shape memory material member is operatively connected to the second end portion, wherein the second shape memory material member extends from the second end portion and across the lateral midpoint of the central portion, and wherein the second shape memory material member is operatively connected to the seat frame at or near the first transition region.

7. The system of claim 6, wherein the first transition region or the second transition region includes a corner.

8. The system of claim 1, wherein, when the first shape memory material member or the second shape memory material member is deactivated, the first shape memory material member or the second shape memory material member disengages the seat pan to cause the seat pan to substantially returns to a non-activated configuration, whereby the seat cushion substantially returns to a non-activated condition.

9. A method of adjusting a vehicle seat, the vehicle seat including a seat portion with a seat cushion, a seat pan, and a seat frame, the seat cushion being at least partially supported by the seat pan, the seat pan being at least partially supported by the seat frame, a first shape memory material member being located between the seat pan and the seat frame, and a second shape memory material member located between the seat pan and the seat frame, the first shape memory material member and the second shape memory material member being arranged in an alternating pattern on opposite sides of the seat pan, the first shape memory material member and the second shape memory material member being arranged so as to overlap each other at one or more points, the method comprising:

receiving sensor data from one or more sensors on a vehicle;

determining, based on the sensor data, whether a seat activation condition is met, the determining including:

comparing the sensor data to at least one of: a vehicle speed threshold, a steering angle threshold, and a lateral acceleration threshold; and when the sensor data meets the vehicle speed threshold, the steering angle threshold, or the lateral acceleration threshold, a seat activation condition is detected;

responsive to determining that the seat activation condition is met, causing one of the first shape memory material member or the second shape memory material member to be activated so as to become taut and directly contact an underside of the entire seat pan to cause the seat pan to tilt in a respective lateral direction, whereby the seat cushion tilts in the respective lateral direction; and responsive to determining that the seat activation condition is no longer met, causing one of the first shape memory material member or the second shape memory material member to be deactivated so as to become slack and to substantially disengage from the seat pan to cause the seat pan to substantially return to a non-tilted orientation.

10. The method of claim 9, wherein causing one of the first shape memory material member or the second shape memory material member to be activated includes causing electrical energy to be supplied to one of the first shape memory material member or the second shape memory material member from one or more power sources.

11. The method of claim 9, wherein the first shape memory material member or the second shape memory material member is a shape memory alloy.

12. The method of claim 9, wherein the first shape memory material member or the second shape memory material member is a shape memory alloy wire.

13. The method of claim 9, wherein the first shape memory material member or the second shape memory material member is arranged in a serpentine pattern.

* * * * *